United States Patent [19]

Dalziel

[11] 4,030,137

[45] June 14, 1977

[54] LEAD SCREW SUPPORT DAMPING MECHANISM

[75] Inventor: Warren L. Dalziel, Monte Sereno, Calif.

[73] Assignee: Shugart Associates, Inc., Sunnyvale, Calif.

[22] Filed: Sept. 23, 1975

[21] Appl. No.: 615,940

[52] U.S. Cl. .................................. 360/106; 74/28; 360/78

[51] Int. Cl.² ...................... G11B 3/12; G11B 5/58; G11B 21/08

[58] Field of Search .............. 360/106, 78, 75, 98, 360/99, 105, 86, 97, 99; 74/26–28, 84

[56] References Cited

UNITED STATES PATENTS

| | | | |
|---|---|---|---|
| 2,110,223 | 3/1938 | Harris | 74/28 |
| 3,226,700 | 12/1965 | Miller | 360/78 |
| 3,566,381 | 2/1971 | Buslik et al. | 360/106 |
| 3,731,292 | 5/1973 | Kelley | 360/98 |
| 3,814,441 | 6/1974 | Craggs | 360/99 |
| 3,875,589 | 4/1975 | Applequist | 360/78 |
| 3,950,783 | 4/1976 | Herring et al. | 360/106 |

*Primary Examiner*—Alfred H. Eddleman
*Attorney, Agent, or Firm*—Boone, Schatzel, Hamrick & Knudsen

[57] ABSTRACT

An improved magnetic read/write head-positioning apparatus including a cantilevered lead screw head carriage-driving mechanism and a damping assembly for damping any transverse motion of the unsupported end of the lead screw. The damping assembly includes a leaf spring having one end affixed to the supporting frame and the other end positioned opposite the unsupported end of the lead screw, and a slider button disposed between the leaf spring and the unsupported lead screw end and carried by the lead screw so as to frictionally engage the leaf spring and cause a force to be exerted on the unsupported lead screw end tending to resist any transverse motion thereof.

10 Claims, 5 Drawing Figures

LEAD SCREW SUPPORT DAMPING MECHANISM

BACKGROUND OF THE INVENTION

1. Field of the Invention

The present invention relates generally to magnetic recording/playback devices and more particularly, to an improved magnetic read/write head-positioning apparatus including means for damping lead screw oscillations.

2. Description of the Prior Art

In magnetic recording/playback apparatus used with flexible or floppy disk recording mediums, a positioning mechanism is employed to move a magnetic head radially across concentric recording tracks on the disk surface while maintaining the head in contact with the disk surface. Typically, the head positioning mechanism includes a stepping motor for driving a lead screw rotatably mounted to its shaft, a guide rod, and a carriage mounted to the lead screw and movable thereby along the guide rod. The carriage includes the read/write head and a load arm for maintaining the disk in compliance with the transduciing surface of the magnetic head. Heretofore, the lead screw has been mounted to the stepping motor with its distal end either cantilevered as illustrated in the U.S. Pat. No. 3,266,700, to Miller, or supported by a bracket which is journaled thereto as shown in the U.S. Pat. No. 3,731,292, to Kelly. Energization of the stepping motor rotates the lead screw to drive the carriage across the disk in such a manner as to enable the magnetic head to radially access a selected one of the tracks on the disk surface.

In such apparatus employing a cantilevered lead screw, vibration problems have been encountered as the magnetic head is accessed from one track to another. More particularly, the interaction between the lead screw and the carriage as the lead screw is actuated by the stepping motor causes transverse forces to be exerted on the lead screw, and the stepping frequency (the seek rate) is such as to cause the forces to excite the lead screw at its natural or resonant frequency, the lead screw will vibrate in a more or less sinusoidal manner and induce a consequent displacement of the magnetic head relative to the disk. This, of course, causes the signal output developed by the head to vary and distort the signal being recorded or played back. In instances of severe vibrations, the magnetic head may even be unloaded from the disk, causing the read signal to be lost entirely.

SUMMARY OF THE PRESENT INVENTION

A primary object of the present invention is to provide a magnetic recording/playback head-positioning apparatus having means for reducing drive-induced vibrations between the head and the recording medium.

Another object of the present invention is to provide a magnetic head-positioning apparatus including a cantilevered lead screw for driving the head carriage mechanism, and means for damping any oscillatory motion set up in the lead screw as a result of the stepping drive action.

Briefly, a preferred embodiment of the present invention includes a stepping motor for mounting to the device housing, a cantilevered lead screw affixed to the motor shaft, a magnetic head carriage driven by the lead screw, and a damping mechanism frictionally engaging the distal end of the lead screw for frictionally resisting transverse motion thereof.

An advantage of the present invention is that it provides a magnetic head-positioning apparatus having a high degree of compliance.

Another advantage of the present invention is that it provides a magnetic head-positioning mechanism which may be driven over a wide range of seek rates in accessing the magnetic head to the several tracks of a magnetic disk.

Still another advantage of the present invention is that it enables data to be accurately read from the disk within 20 milliseconds after the magnetic head is stepped from one track to another.

Other objects and advantages of the present invention will be apparent to those skilled in the art after having read the following detailed description of the preferred embodiments which are illustrated in the several figures of the drawing.

IN THE DRAWING

DETAILED DESCRIPTION OF THE PREFERRED EMBODIMENT

Figure 1:
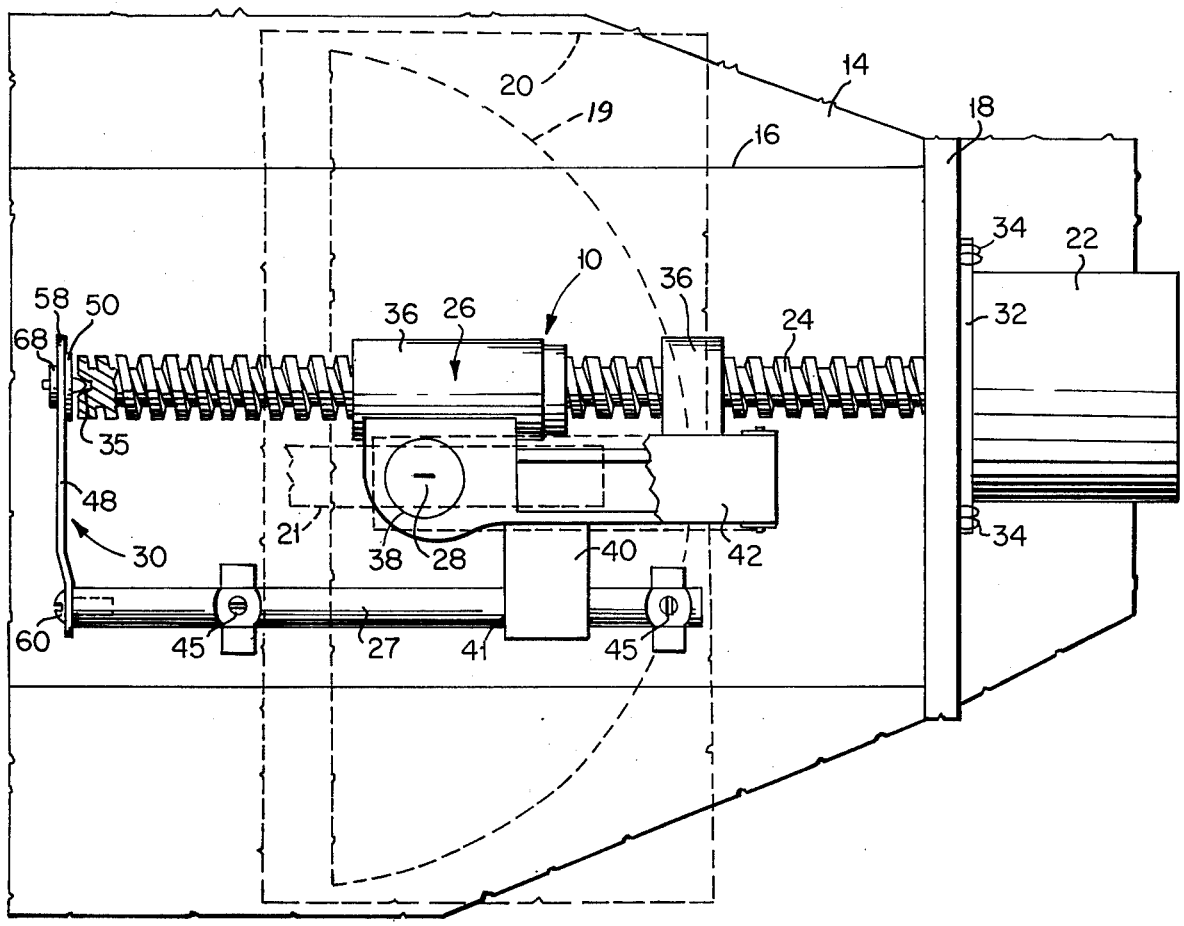
FIG. 1 illustrates a portion of a magnetic recording/playback device employing a magnetic head-positioning apparatus in accordance with the present invention.

In FIG. 1 of the drawing, a magnetic head-positioning apparatus 10, in accordance with the preferred embodiment of the present invention, is shown mounted to a partially illustrated disk drive device 12. The device 12 includes a main frame 14 having a recessed portion 16 and a web 18 which extends normal to the face of frame 14. A drive spindle (not shown) is disposed within the recess 16 just to the left of the depicted portion and serves to driveably engage a flexible disk 19 enclosed in an envelope 20 as partially shown by the dashed lines. The envelope 20 is provided with an elongated read/write aperture 21 through which data may be recorded onto and read from the disk 18.

The magnetic head-positioning apparatus 10 includes an electric stepper motor 22, a lead screw 24 mounted to the drive shaft of motor 22, a carriage 26 mounted to the lead screw 24, a magnetic head 28 mounted to the carriage 26, a carriage guide bar 27 and a damper assembly 30.

The stepper motor 22 is affixed to the web 18 by bolts 34 and serves to rotate the lead screw 24 clockwise or counterclockwise in 15° increments under the external control of the disk drive system. The distal end of lead screw 24 includes a counter-sunk hole 35 which is concentric with the axis of lead screw 24.

Figure 2:
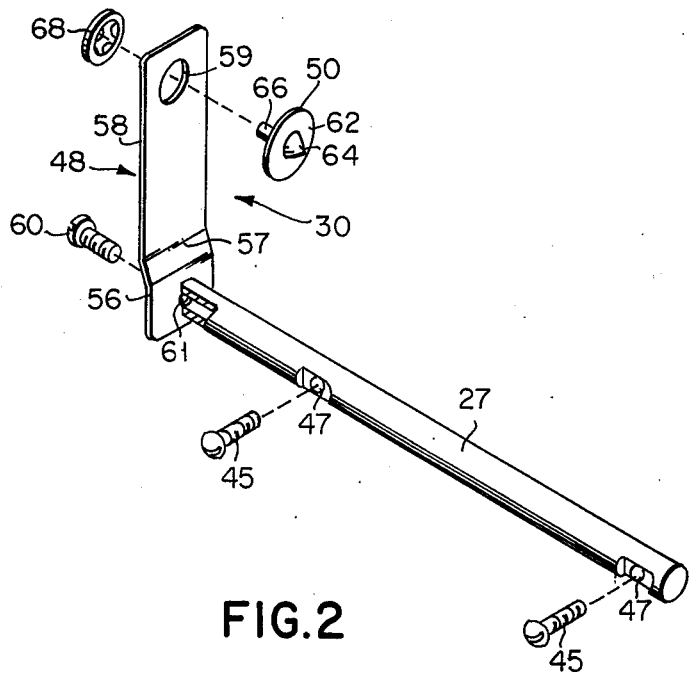
FIG. 2 is an exploded view of the lead screw damper assembly shown in FIG. 1.

The carriage 26 includes two coaxial tubular portion 36 at least one of which is threaded to mate with the lead screw 24, an aperture 38 for receiving the magnetic head 28, and a foot portion 40. The foot portion 40 includes a notch 41 for slideably engaging the guide bar 27. A load arm 42, partially shown, is spring loaded and pivotally mounted to the carriage 26 and includes a pressure pad (not shown) for pressing the disk 19 against the magnetic head 28. Responsive to an appropriate seek signal, the stepper motor 22 incrementally rotates the lead screw 24. Rotation of the lead screw 24 correspondingly steps the carriage 26, and hence the magnetic head 28, radially relative to the disk 19 from one track to an adjacent track. In the preferred embodiment the pitch of the threads on lead screw 24 is selected such that rotation through a 15° increment causes the carriage 26, and thus the magnetic head 28, to move radially a distance corresponding to one track position. As more clearly shown in FIG. 2, the rod 27 includes two mounting holes 47 oriented transverse to the axis of the rod and a threaded hole 49 extending axially into the end of the rod. The rod 27 is mounted to frame 14 by screws 45 and is positioned to mate with notch 41 and serves as a guide for carriage 26 to prevent it from rotating about the lead screw.

The damper assembly 30 is shown attached to guide rod 27 and is depicted to include a leaf spring 48 and a slider 50. The spring 48 is generally rectangular in shape and includes a lower portion 56 and an upper portion 58 having a length about three times the length of lower portion 56. Spring 48 is bent at 57 so that portion 58 is bent approximately 10° relative to portion 56. Holes 59 and 61 are formed in the upper and lower portions, respectively. A screw 60 is used to secure spring 48 to rod 46. In the preferred embodiment the spring is formed from a flat sheet of 300 series stainless steel and provides a bias force of 250 grams, although the force may be in the range between 50 to 400 grams.

The slider 50 is formed from a solid material which has a good wear characteristic and which has a coefficient of friction that is substantially constant over the disk drive's range of operating temperatures and humidity. In the preferred embodiment the slider is molded from an acetal fluorocarbon such as teflon-filled delrin and includes a disk portion 62, a lead screw-engaging teat 64 protruding outwardly from the center of the opposite surface of the disk portion 62. The teat 64 is generally dome-shaped and is adapted to fit within the countersunk hole 35. The stub portion 66 is substantially smaller in cross section than the diameter of the hole 59 in spring 48 so that it may move freely relative to spring 48. A spring clip 68 is affixed to the stub portion 66 to loosely mount the slider 50 to the spring 48. Spring 48 is positioned with hole 59 concentric with the axis of lead screw 24 so that slider 50 does not interface with transverse motion of lead screw 24 but merely applies a frictional damping force to such motion. The magnitude of the frictional force is, of course, determined by the friction coefficients of the mating surfaces of slider 50 and the face of spring 48 and by the spring force exerted by spring 48.

As indicated above, loss of compliance and degradation in read signal after stepping is due mainly to lead screw vibration. The component of the vibration normal to the disk causes an inertial force to be imposed upon the load arm, and this in turn modulates the static head load force. If the vibration is severe enough, such as at resonance, the inertial force is great enough to cause complete loss of compliance.

Figure 3:
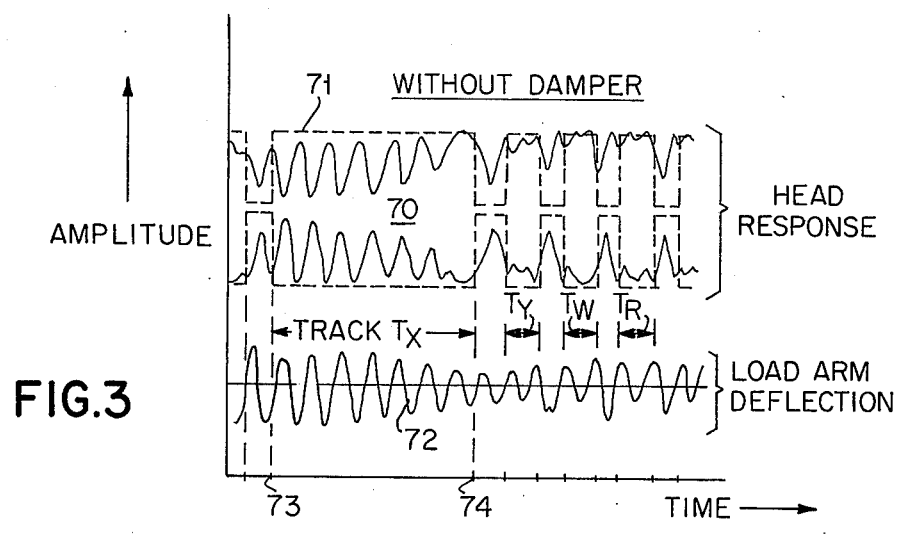
FIG. 3 is a diagram illustrating read signals versus time and load arm displacement versus time for a prior art magnetic recording/playback apparatus using a cantilevered lead screw.
Figure 4:
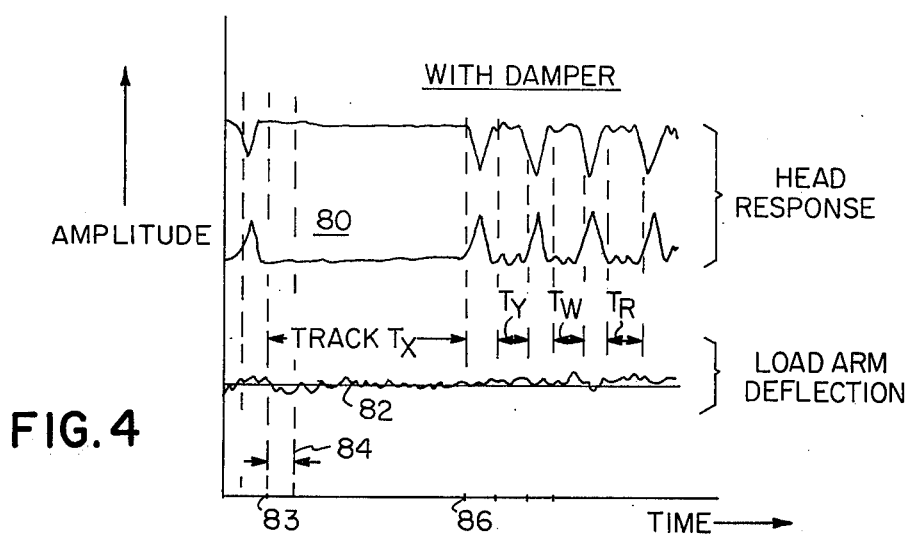
FIG. 4 is a diagram illustrating read signal versus time and arm displacement verses time for a magnetic recording/playback apparatus in accordance with the present invention.

In order to demonstrate the operational improvement achieved by the present invention as compared to a prior art cantilevered lead screw head-positioning mechanism, reference is made to FIGS. 3 and 4 of the drawings. FIG. 3 is a diagram illustrating a head response envelope 70 and a load arm deflection curve 72 plotted in terms of amplitude versus time for a prior art undamped lead screw embodiment. In FIG. 4, a similar set of curves 80 and 82 are depicted to illustrate a head response envelope and load arm deflection curve for a device including a lead screw damping mechanism in accordance with the present invention. In order to generate these curves, an undamped lead screw embodiment was operated at the worst case "seek rate," i.e., the lead screw drive motor stepping rate at which the lead screw oscillation amplitudes are the largest.

For this demonstration each track on the disk to be read was prerecorded with a continuous series of logic "ones" so that for the ideal case, curve 70 would have the configuration illustrated by the dashed lines 71 with the zero amplitude portions representing the separating spaces between tracks and the maximum amplitude portions representing the stored data which is read when the head is positioned above each track. As previously indicated, the undamped embodiment was operated at its worst case seek rate so as to set up the oscillatory lead screw condition illustrated by curve 72. However, at time 73 the seeking action was interrupted and the head was held on track X until time 74 at which time the worst case seek rate was continued.

By comparing the envelope 70 to the ideal envelope 71, it can be seen that the effect of the lead screw oscillation is to cause a modulation of the data read out. This, of course, means that in order to obtain highly accurate and meaningful data from a particular track, a settling period must be allowed for after the head has been positioned on a particular track, thus severely limiting the access speed of the apparatus.

After the data illustrated in FIG. 3 was taken, the lead screw damping mechanism of the present invention was applied to the disk drive apparatus and the above-described sequence of operation was repeated with the data illustrated in FIG. 4 being taken. Since the surface of spring 48 of damper assembly 30 is constantly frictionally loaded against the mating surface of slider 50, any transverse motion of the lead screw 24 is frictionally opposed by the frictional forces between the spring surface and the slider, and such action tends to damp the vibratory motion of lead screw 24. Such damping changes the vibration characteristics of the lead screw and prevents it from resonating.

At time 84 the head is settled over the track and thereafter the amplitude of the envelope remains substantially constant until time 86 when the head is again moved to another track. The damping interval (between 83 and 84) is approximately 10 milliseconds. This relatively short time interval (settling time) allows good data to be read out by the head much quicker than could be previously done. Also, because resonance of the lead screw is prevented from occuring, all available seek rates can be used in accessing the head from track to track.

The effectiveness of damper 30 is further evidenced by curve 82. As shown, load arm 42 displacement with the damper assembly 30 in use is greatly reduce from the displacement illustrated by curve 72 of FIG. 3 where the damper assembly was not used. Moreover, in curve 82, there is no evidence of the sinusoidal oscillating tendency of the arm 42 apparent from curve 72. Thus, not only is the magnitude of the displacement of arm 42 decreased but its tendency to oscillate is also eliminated. It will thus be appreciated that through the use of the present invention the access time, head compliance and signal degradation are substantially improved.

Figure 5:
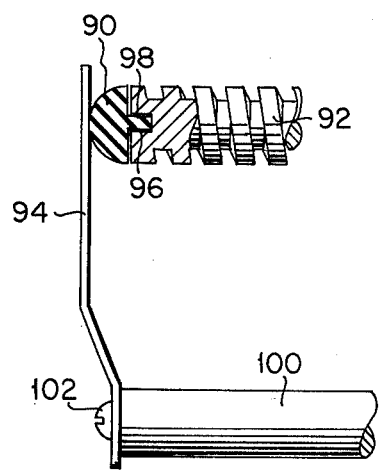
FIG. 5 illustrates an alternative embodiment of the damper assembly.

Referring now to FIG. 5 an alternative embodiment of the damper assembly and lead screw are partially illustrated. The fundamental difference between this embodiment and that previously described is that the damping slider 90 is carried by the lead screw 92 instead of spring 94. The dome-shaped slider button 90 is made of an acetal fluorocarbon and includes a stub portion 96 which is inserted into the hole 98 in the end of lead screw 92. As in the previous embodiment the spring 94 is secured to the end of guide rod 100 by a screw 102. The spring is biased against the button 90 with a force sufficient to exert the desired frictional force thereagainst. Where a greater frictional force is required between the button 90 and the surface of spring 94, it will be appreciated that either the spring force could be increased or the button surface could be flattened to provide a larger contact area.

Although only two preferred embodiments of the present invention have been shown and described in detail above, it is contemplated that numerous other alternative embodiment will become apparent to those skilled in the art. Accordingly, it is intended that the following claims be interpreted to cover all such alternative embodiments as fall within the true spirit and scope of the invention.

What is claimed is:

1. A magnetic read/write head-positioning apparatus comprising:
    a frame;
    a stepping motor mounted to said frame;
    a cantilevered lead screw having one end mounted to the drive shaft of said motor and the other end unsupported, said lead screw being adapted to drive a magnetic read/write head, the unsupported end of said lead screw tending to vibrate in a transverse direction when rotated by said motor due to torsional reaction forces created in moving the head; and
    damping assembly means disposed at said unsupported end of said lead screw and including first means carried by said unsupported end and forming a first surface, and resilient means affixed to said frame and forming a second surface, said resilient means being disposed to cause said second surface to engage said first surface with a force directed along the axis of said lead screw, whereby the frictional forces developed between said first and second surfaces due to transverse vibrating motion of said unsupported end tend to resist such motion.

2. A magnetic read/write head-positioning apparatus as recited in claim 1 wherein said resilient means includes an elongated resilient member having one end portion affixed to said frame and another end portion forming said second surface, said second surface being disposed opposite the unsupported end of said lead screw.

3. A magnetic read/write head-positioning apparatus as recited in claim 2 wherein said first means includes a slider button having said first surface formed on one side and means formed on the other side for engaging said unsupported end of said lead screw so that said slider button is caused to follow any transverse motion of said unsupported end.

4. A magnetic read/write head-positioning apparatus as recited in claim 3 wherein said resilient member includes an aperture extending through said second surface and said slider button includes an elongated stub projecting from said one side and extending through said aperture, the transverse dimension of said stub being substantially less than the corresponding dimension of said aperture.

5. A magnetic read/write head-positioning apparatus as recited in claim 4 wherein said unsupported end of said lead screw includes a recess disposed concentric therewith and said slider button includes a second elongated stub projecting from said other side and adapted to be received within said recess.

6. A magnetic read/write head-positioning apparatus as recited in claim 3 wherein said unsupported end of said lead screw includes a recess disposed concentric therewith and wherein said means formed on said other side of said slider button includes an elongated stub projecting from said other side and adapted to be received within said recess.

7. A magnetic read/write head-positioning apparatus as recited in claim 1 wherein said resilient means is a leaf spring capable of exerting a force of between 50 and 400 grams against said unsupported end of said lead screw.

8. A magnetic read/write head-positioning apparatus as recited in claim 1 wherein said first means includes a slider button having a generally hemispherically configured side forming said first surface and means formed on the other side for engaging said unsupported end of said lead screw so that said slider button is caused to follow any transverse motion of said unsupported end.

9. A magnetic read/write head-positioning apparatus as recited in claim 3 wherein said slider button is made of an acetal fluorocarbon material and wherein said resilient member is a metal leaf spring.

10. A magnetic read/write head-positioning apparatus as recited in claim 9 wherein said resilient member is affixed to one end of an elongated carriage guide means which is affixed to said frame.

* * * * *